United States Patent
Nummelin et al.

[19]

[11] Patent Number: 5,937,032
[45] Date of Patent: *Aug. 10, 1999

[54] TESTING METHOD AND APPARATUS FOR VERIFYING CORRECT CONNECTION OF CURCUIT ELEMENTS

[75] Inventors: Arto Juhani Nummelin, Älvsiö; Peter Carl Birger Lundh, Farsta; Erik Oscar Abefelt, Vällingby; Karl Anders Bjenne, Huddinge, all of Sweden

[73] Assignee: Telefonaktiebolaget L M, Ericsson, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/564,663

[22] Filed: Nov. 29, 1995

[51] Int. Cl.$^6$ .............................. H04M 1/24; H04M 3/08; H04M 3/22

[52] U.S. Cl. .................................. 379/10; 379/2; 379/16; 379/26; 370/242; 370/248; 370/250

[58] Field of Search .................................. 379/1–2, 6, 10, 379/12, 16, 22–23, 25–26, 28–29, 31, 27, 9, 15, 24, 32, 33, 34, 17; 370/241, 242, 244, 248, 250

[56] References Cited

U.S. PATENT DOCUMENTS

| | | | |
|---|---|---|---|
| 4,608,700 | 8/1986 | Kirtley, Jr. et al. | 375/36 |
| 4,750,175 | 6/1988 | Brennenman et al. | 371/22 |
| 4,845,736 | 7/1989 | Posner et al. | 379/27 |
| 4,860,334 | 8/1989 | Kohl et al. | 379/16 |
| 4,907,253 | 3/1990 | Watrous | 379/16 |
| 4,937,825 | 6/1990 | Ballard et al. | 371/20.1 |
| 5,007,051 | 4/1991 | Dolkas et al. | 370/85.1 |
| 5,012,466 | 4/1991 | Buhrke et al. | 370/62 |
| 5,127,006 | 6/1992 | Subramanian et al. | 371/16.1 |
| 5,142,653 | 8/1992 | Schefts | 379/16 |
| 5,144,293 | 9/1992 | Rouse | 340/825.02 |
| 5,198,808 | 3/1993 | Kudo | 379/17 |
| 5,347,270 | 9/1994 | Matsuda et al. | 379/16 |
| 5,347,513 | 9/1994 | Abefelt et al. | 370/58.3 |
| 5,479,396 | 12/1995 | Kusano | 379/2 |

FOREIGN PATENT DOCUMENTS

| | | |
|---|---|---|
| 0 264 239 A2 | 4/1988 | European Pat. Off. |
| 0 325 318 A2 | 7/1989 | European Pat. Off. |
| 0 335 510 A2 | 10/1989 | European Pat. Off. |
| 0 403 451 A1 | 12/1990 | European Pat. Off. |
| 0522 193 A1 | 1/1993 | European Pat. Off. |
| A61258599 | 4/1987 | Japan . |

*Primary Examiner*—Curtis A. Kuntz
*Assistant Examiner*—Binh K. Tieu
*Attorney, Agent, or Firm*—Jenkens & Gilchrist, P.C.

[57] ABSTRACT

A method and apparatus for testing for correct connection together of circuit elements in a circuit formed of a plurality of redundant circuit portions. A coded signal is generated at a first circuit element and transmitted upon a signal path believed to connect the first circuit element with a second circuit element. If the coded signal is detected at the second circuit element, the correct connection of the first circuit element together with the second circuit element is verified. Because a coded signal is generated, the correct connection between the circuit elements can be verified even when the signal path connecting the first and second circuit elements is formed of an optical, or other non-electrical, coupler.

14 Claims, 7 Drawing Sheets

| BITS: | 7 | 6 | 5 | 4 | 3 | 2 | 1 | 0 | |
|---|---|---|---|---|---|---|---|---|---|
| | LID | | UPDATE | | STA | | | TFA | |
| | 0 | 1 | 0 | 1 | 0 | 1 | 1 | 0 | NOT ACTIVE |
| | 1 | 0 | 1 | 0 | 1 | 0 | 0 | 1 | ACTIVE |

TESTING METHOD AND APPARATUS FOR VERIFYING CORRECT CONNECTION OF CURCUIT ELEMENTS

CROSS-REFERENCE TO RELATED PATENTS

The present invention is related to commonly-assigned U.S. Pat. No. 5,347,513, the contents of which are incorporated by reference herein.

BACKGROUND OF THE INVENTION

The present invention relates generally to a testing method and apparatus for verifying the correct assembly of a circuit, such as a telephonic switch, having circuit elements connectable together by connecting elements. More particularly, the present invention relates to a method, and an associated apparatus, for verifying correct connection together of circuit elements by way of connecting elements in a circuit having redundant circuit portions.

Information-related technologies oftentimes utilize devices capable of acting upon data. Data is, for instance, transferred, stored, transmitted, received, or otherwise communicated, during operation of the devices. Such devices must be capable of dependably performing the functions for which they are intended. Improper operation of, or failure of, such devices, could result in the irretrievable loss of the data being operated upon by such devices. Care is taken, therefore, in the design and construction of the circuitry of such devices to ensure that the circuitry is as reliable as possible.

One manner by which to increase the reliability of such circuitry and minimize the possibility of the loss of data due to failure of the circuitry is to provide redundancy to the circuitry. Redundant circuitry is operable simultaneously to receive the same input data, perform the same operations upon the data, and to generate the same output data. The likelihood of concurrent failure of the redundant circuitry is typically less than the likelihood of failure of circuitry which is not provided with redundancy. Accordingly, the dependability of devices utilizing the redundant circuitry is typically better than devices without redundant circuitry. By increasing the amount of redundancy, that is, by providing multiply-redundant circuitry, the likelihood of concurrent failure of all of the multiply-redundant circuitry is further reduced.

A telephonic switch is exemplary of an electronic circuit utilized in the communication of data. A telephonic switch is an essential part of a telephonic communication system and is operable to provide connections which permit communication links to be effectuated between calling and receiving stations of the telephonic communication system.

While the function of a telephonic switch may be fairly simply visualized, telephonic switches utilized in commercial telephonic systems are fairly complex devices capable of forming concurrent communication links between many pairs, or more, of calling and receiving stations. Significant numbers of communication signals, each containing data, are input to, and output from, a typical, telephonic switch during operation thereof.

An example of such a telephonic switch is disclosed in the aforementioned U.S. Pat. No. 5,347,513, the disclosure of which is incorporated herein by reference.

The switch disclosed in U.S. Pat. No. 5,347,513 includes redundant circuitry portions for reasons including those discussed above. Other telephonic switches and, more generally, other types of circuitry utilized in information-related, and other, technologies similarly utilize redundant circuitry portions.

In normal operation of the telephonic switch disclosed in U.S. Pat. No. 5,347,513, data input to the switch is transmitted along each of three redundant circuitry portions. As the data is acted upon during operation of the switch, a polling of the values of acted-upon data is performed. Values of acted-upon data of a redundant circuit portion which is faulted or failed shall likely be dissimilar to the values of the acted-upon data of unaffected redundant circuitry portions. When such a dissimilarity is detected, the affected circuitry portion can be isolated from unaffected circuitry portions. Appropriate repair or replacement of the affected circuitry portion may take place when convenient or otherwise possible. In the meantime, the unaffected circuitry portions remain operable.

Assembly of a circuit, such as the above-noted telephonic switch, requires the redundant circuit portions each to be connected at their respective inputs and outputs, to the same circuit locations. Additionally, a single redundant circuit portion might well be disposed upon several separate circuit boards. During assembly of the circuit, a circuit assembler must properly connect together the circuit boards, such as by way of a physical or optical coupler, which form each of the redundant circuit portions. As corresponding connections together of the circuit boards of each of the redundant circuit portions must be performed by the circuit assembler, the circuit assembler is typically required to make many connections during assembly of the circuit.

For example, as noted above, the telephonic switch disclosed in the aforementioned U.S. Pat. No. 5,347,513, utilizes a three-fold circuit redundancy. The circuit assembler is therefore required to interconnect a fairly significant number of circuit boards during assembly of the telephonic switch. Other switches, as well as other circuits having redundant circuitry portions, similarly typically also require a significant number of interconnections during their assembly.

Because of the significant number of interconnections required to be performed during assembly, a circuit assembler might fail to properly interconnect all of the circuit portions in the proper manner. If the circuit assembler instead interconnects circuit portions of different ones of the redundant circuit portions, such misconnection might not be detected during normal testing of the circuit as an operable circuit might still be formed.

However, upon failure of, or fault in, one of the circuit portions, the misconnection might result in isolation or removal of an unaffected, rather than an affected, circuit portion out of the circuit. Such an occurrence would not only defeat the utility of redundant circuitry portions, but could also cause the irretrievable loss of data being acted upon by the telephonic switch or other circuit.

A test by which to determine proper connection of the various elements of a circuit having redundant circuit portions would therefore be advantageous. Misconnection of circuit elements could be detected, and appropriate corrective actions could be taken.

It is in light of this background information related to circuits having redundant circuitry portions, such as a telephonic switch, that the significant improvements of the present invention have evolved.

SUMMARY OF THE INVENTION

The present invention advantageously permits testing for proper connection between circuit elements of a circuit, such as a telephonic switch, having redundant circuit portions. A determination can be made that the circuit elements have been properly connected together even when the coupler is formed of an optical, or other non-electrical, coupling device. If a determination is made that the circuit elements have not been correctly connected together, appropriate, remedial re-assembly operations can be commenced. Because operation of the present invention permits determination of erroneous interconnection of circuit elements, erroneous interconnection between circuit elements of redundant circuit portions can be detected and corrected. Proper operation of the redundant circuit portions can thereby be assured.

In one aspect of the present invention, a method, and an associated apparatus, tests for correct connection together of circuit elements in a circuit formed of a plurality of redundant circuit portions. The redundant circuit portions include at least a first circuit element and a second circuit element which, when properly connected together, are connected together by a signal path. A signal of a selected, coded signal value is generated at the first circuit element. The coded signal is then generated upon the signal path. The correct connection of the first circuit element together with the second circuit element is verified if the signal generated at the first circuit element and transmitted upon the signal path is received at the second circuit element.

In another aspect of the present invention, a method, and an associated apparatus, tests for correct connection together of circuit boards of redundant circuit planes of a telephonic switch. A selected sequence of signal bits is caused to be generated at the first circuit board and transmitted upon the signal path believed to connect the first circuit board and the second circuit board together. The correct connection of the first circuit board together with the second circuit board is verified if the sequence of selected signal bits generated at the first circuit board is received at the second circuit board.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
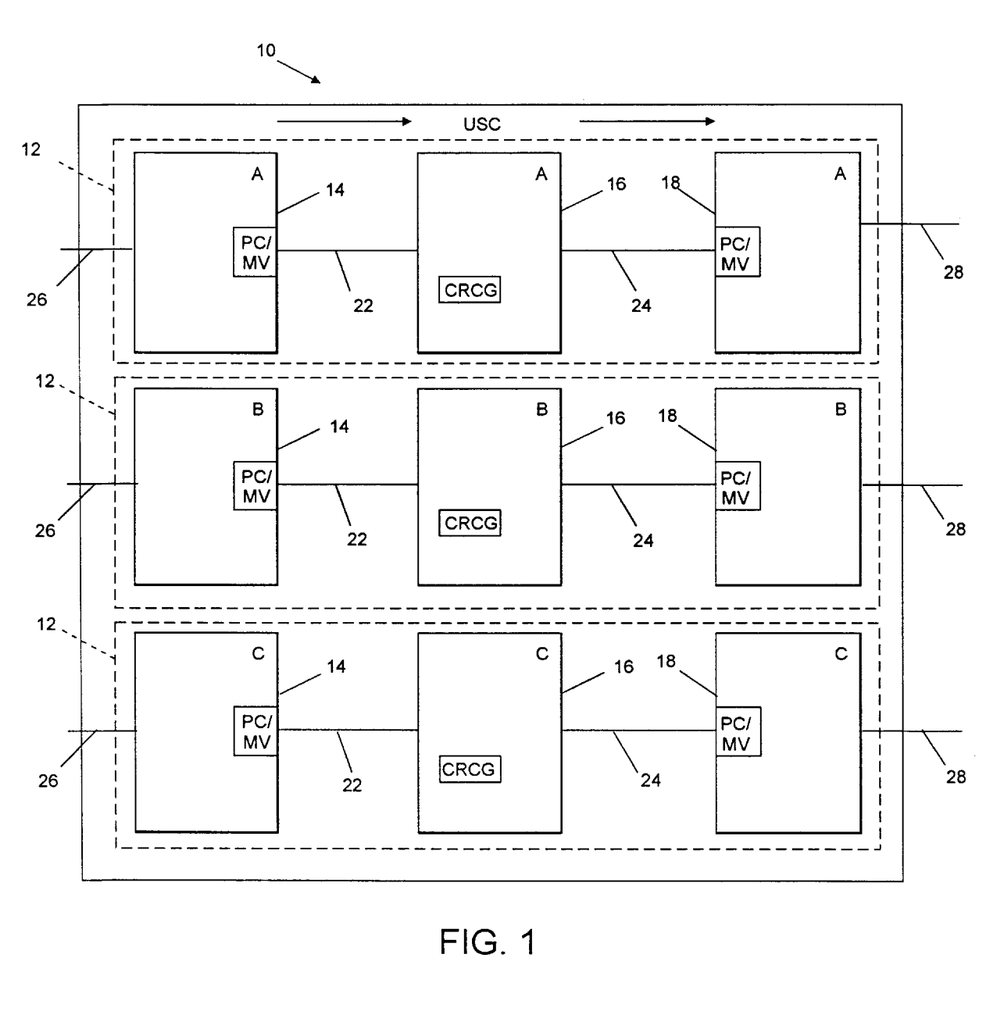
FIG. 1 is a functional block diagram of a circuit having redundant circuit portions in which correct connections between circuit elements thereof can be tested during operation of an embodiment of the present invention.

FIG. 1 illustrates a circuit, shown generally at 10 which can be testing during operation of an embodiment of the present invention. The circuit 10 is representative of many types of devices having redundant circuit portions, including the telephonic switch disclosed in the aforementioned U.S. Pat. No. 5,347,513.

It should be noted, of course, that the circuit 10 is exemplary in nature and that an embodiment of the present invention can be used to test other circuits. It should further be noted that, while, for purposes of explanation, the following description of operation of embodiments of the present invention shall be discussed with respect to a telephonic switch forming the circuit 10, operation of the present invention may alternately be described with respect to any of many other devices.

The circuit 10 includes three circuit portions 12, each of which are identically formed. In the exemplary illustration, each circuit portion 12 includes a first circuit element 14, a second circuit element 16, and a third circuit element 18.

When the circuit 10 is formed of a telephonic switch, the first circuit elements 14 are formed of terminal connection units. The terminal connection units are conventional in nature and are formed of bi-directional multiplexer/demultiplexer elements. The circuit elements 16 are formed of switch cores which include central switch circuits (not separately illustrated in the figure), and the circuit elements 18 are similar to the terminal control units forming the first circuit elements 14. Again, the terminal connection units forming the circuit elements 18 are bi-directional in nature and form multiplexer/demultiplexer elements.

The first and second circuit elements 14 and 16 of each circuit portions 12 are connected together by way of signal paths 22, and the second and third circuit elements 16 and 18 are connected together by way of signal paths 24. The signal paths 22 and 24 of each of the circuit portions 12 may be formed of any type of coupling, such as electrical couplers, optical couplers, or other types of non-electrical couplers.

As examination of FIG. 1 indicates, the top-most circuit portion 12, the middle-positioned circuit portion 12, and the bottom-most circuit portion 12 are identical to one another in configuration. For instance, by applying the same signal to the terminal connection units of the three circuit portions on the lines 26, each of the three circuit portions 12 act upon such input signals in identical manner and generate identical outputs. The outputs, for example, might be generated upon the lines 28 extending from each of the circuit portions 12. As the terminal connection units forming the circuit elements 14 and 18, when the circuit 10 is formed of a telephonic switch, are bidirectional in nature, either, or both of the elements 14 and 18 of the circuit portions 12 can be considered to be "input" or "output" sides, depending upon the particular application of signals and circuit operation.

As described above, the values of the signals acted upon during operation of the circuit portions 12 are polled. When the circuit portions 12 are all functioning properly, the values of the signals, once acted upon during operation of the three circuit portions 12, are identical. In the event of a failure of, or fault in, any of the circuit elements 14, 16, or 18, or signal paths 22 or 24 of one of the circuit elements 12, the value of the signal once acted upon by the affected circuit portion shall be dissimilar to the value of the signals acted upon by unaffected circuit portions.

Responsive to any such detected dissimilarities detected by such polling, the affected circuit portion 12 can be isolated from the unaffected circuit portions and the circuit 10 can continue to be operative as the remaining ones of the circuit portions 12, being redundant to the affected circuit portion 12, remain operative.

Figure 2:
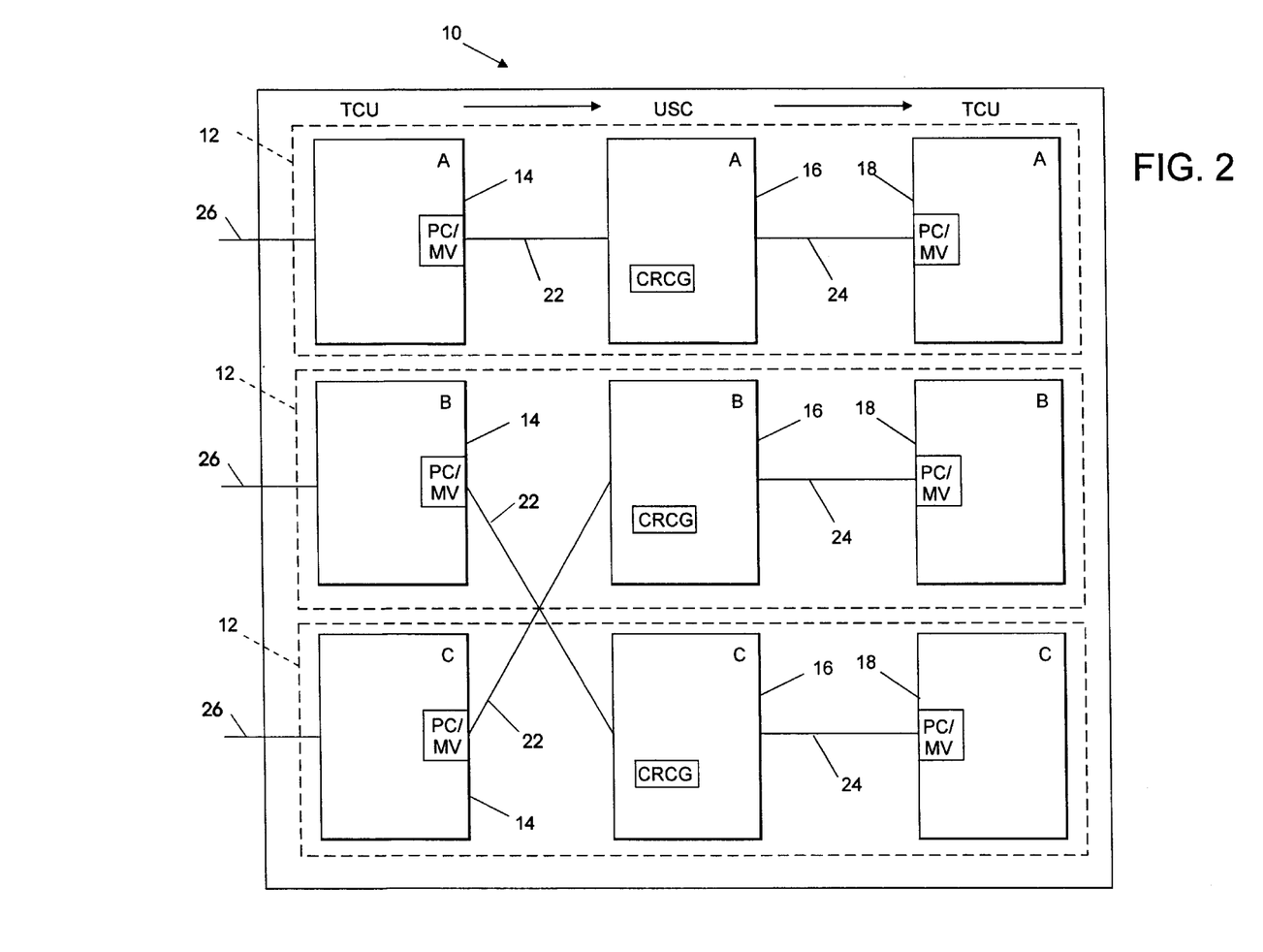
FIG. 2 is a functional block diagram, similar to that shown in FIG. 1, but in which circuit elements of two redundant circuit portions are misconnected.

FIG. 2 again illustrates the circuit 10, again representative of, for example, a telephonic switch. The circuit 10 is again shown to be formed of three identical circuit portions 12, each formed of first, second and third circuit elements 14, 16, and 18. In the illustration of FIG. 2, the top-most circuit portion 12 includes signal paths 22 and 24 which correctly connect the first, second, and third circuit elements 14, 16, and 18 thereof together. However, the couplings interconnecting the first and second circuit elements 14 and 16 of the middle-positioned and bottom-most circuit portions are misconnected. That is to say, the first circuit element 14 of the middle-positioned circuit portion 12 is connected by way of a signal path 22 to the second circuit element 16 of the bottom-most circuit portion 12. And, the first circuit element 14 of the bottom-most circuit portion 12 is coupled by way of a signal path 22 to the second circuit element 16 of the middle-positioned circuit portion.

During normal operation of the circuit 10 in which all of the circuit elements and signal paths of all three circuit portions 12 are normally operative, the values of the signals, once acted upon by circuit portions, remain identical with one another. That is to say, the misconnected signal paths 22 of the middle-positioned and bottom-most circuit portions 12 do not affect operation of the circuit 10. However, in the event of a failure of, or fault in, a circuit element or signal path of either the middle-positioned or bottom-most circuit portion 12, the affected circuit portion cannot be isolated from remaining portions of the circuit.

FIG. 3 again illustrates the circuit 10, again representative of, for example a telephonic switch. The misconnected signal path 22 connecting the first circuit element 14 of the middle-position circuit portion 12 and the second circuit element 16 of the bottom-most circuit portion 12 is again shown.

Figure 3:
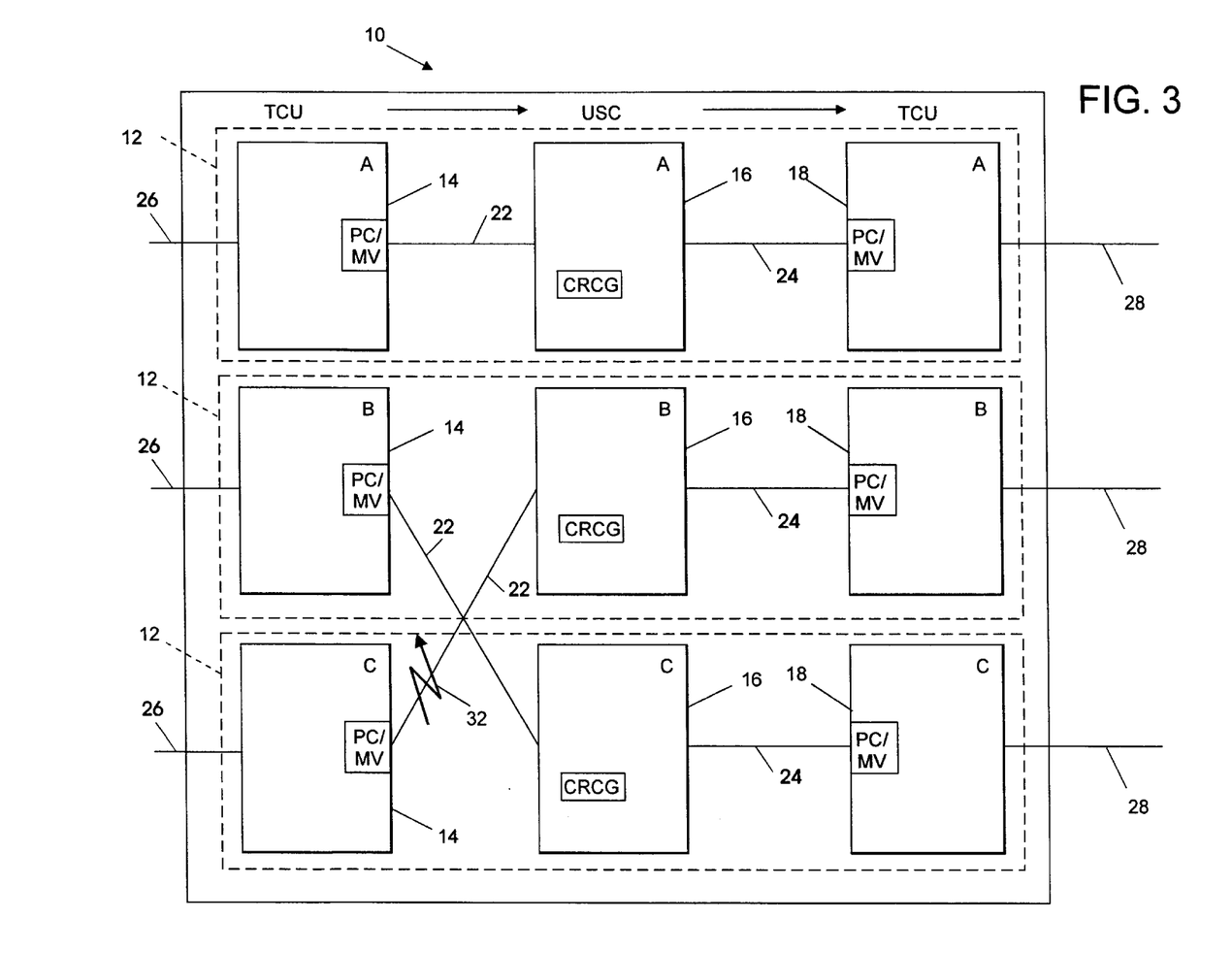
FIG. 3 is a functional block diagram similar to those shown in FIGS. 1–2, but wherein a fault is formed in a coupling which couples together two misconnected circuit elements of two of the redundant circuit portions.

In the illustration of FIG. 3, however, a fault, represented by the arrow 32, is formed in the misconnected signal path 22 positioned between the first circuit element 14 of the bottom-most circuit portion 12 and the second circuit element 16 of the middle-positioned circuit portion. Because of the fault in the signal path, the value of the signal, if any, once acted upon by the middle-positioned circuit portion 12 will be dissimilar with the values of the signals once acted upon by the top-most and bottom-most circuit portions 12, respectively.

The polling will indicate the failure of, or fault in, the middle-positioned circuit portion 12. Once the middle-positioned circuit portion is thereafter isolated responsive to detection of the failure of, or fault in, the middle-positioned circuit portion, the first circuit element 14 of the middle-positioned circuit portion is isolated in addition to the other circuit elements of the circuit portion. Because of the misconnection of the signal path 22 extending from the first circuit element 14 of the middle-positioned circuit portion 12, isolation of the first circuit element 14 thereby causes failure of the bottom-most circuit portion 12 because of the misconnected signal path.

If, as is conventional, testing is performed to ensure merely that the redundant circuit portions 12 of the circuit 10 are all operable, misconnections between circuit elements of different ones of the circuit portions are not detected. As long as all of the circuit portions operate properly, the misconnections between the redundant circuit portions do not affect the operability of the circuit.

However, in the event of a subsequent fault or circuit failure, isolation of the suspected, affected, circuit portion results in failure of at least an additional circuit portion. In the exemplary circuit 10 formed of, e.g., a telephonic switch having a three-way redundancy, a fault or failure in a circuit portion having a misconnected signal path results in isolation of at least two circuit portions. As the circuit 10 includes a three-way redundancy, the misconnection of the signal path causes the circuit portions to become inoperable, and the advantage of circuit redundancy is wholly defeated.

Testing for a proper connection of the signal paths is therefore necessary to prevent problems resulting from misconnecting signal paths between redundant circuit portions. Operation of an embodiment of the present invention, as shall be described in detail below, tests for the correct connection of circuit elements of a circuit path in a circuit having redundant circuit portions. When a misconnection is detected, corrective reassembly of the misconnected circuit elements can be undertaken to prevent subsequent problems, such as those described above, from occurring.

Figure 4:
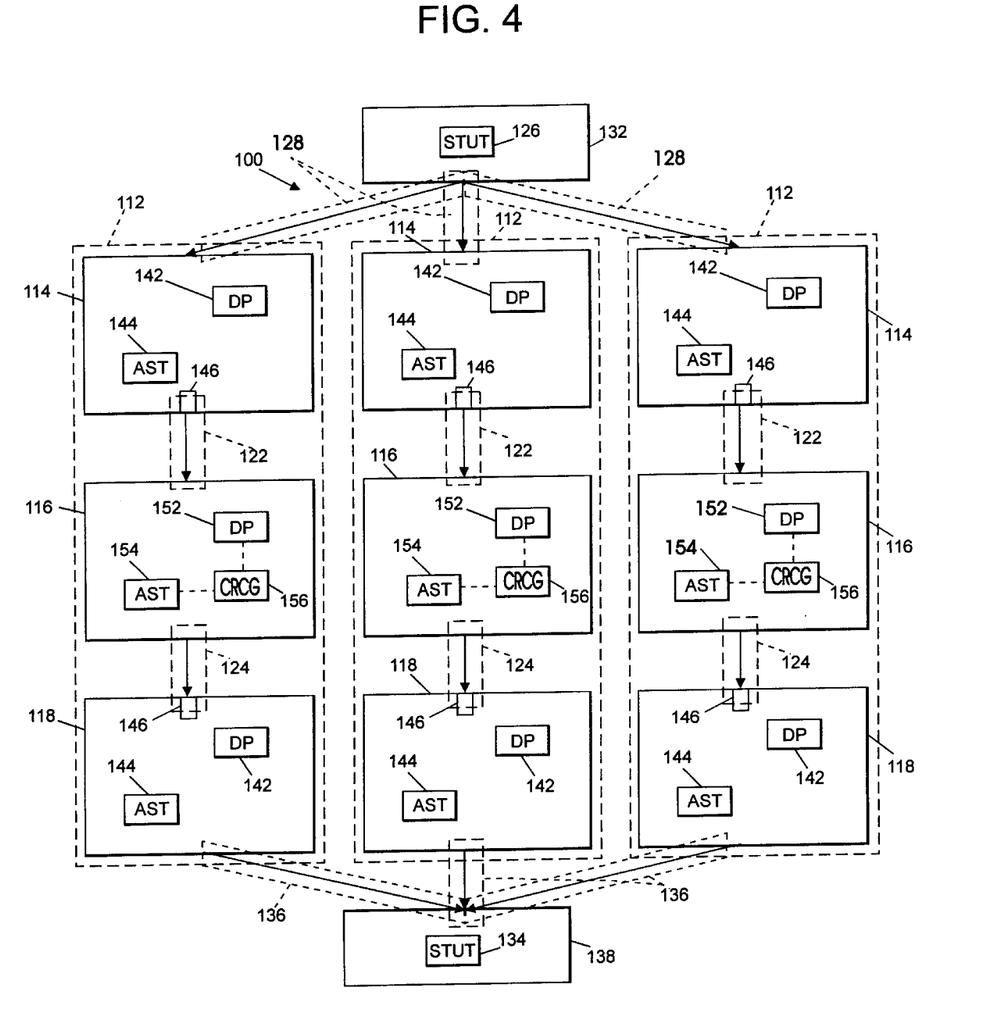
FIG. 4 is a functional block diagram of a telephonic switch having redundant circuit portions in which correct connections between circuit elements thereof can be tested during operation of an embodiment of the present invention.

FIG. 4 illustrates a telephonic switch, shown generally at 100. Operation of an embodiment of the present invention permits connections between various of the circuit elements of the switch 100 to be tested to verify the correctness of their connections. The switch 100 can, for example, be formed of the switch disclosed in the aforementioned patent, U.S. Pat. No. 5,347,513. Further details of the switch and its operation are disclosed therein.

Analogous to the circuit 10, also representative of a telephonic switch shown in FIG. 1, the switch 100 includes three redundant circuit portions 112. Each of the redundant circuit portions include first, second, and third circuit boards 114, 116, and 118, respectively. Circuitry disposed upon the first circuit boards 114 form conventional, terminal connection units which are bi-directional, multiplexer/demultiplexer devices. While shown in block form in the figure, the terminal connection units may actually be a series of cascaded multiplexer/demultiplexer devices, disposed upon a series of circuit boards and coupled together by couplers analogous with the couplers forming the signal paths 22 and 24 shown in FIGS. 1–3.

Circuitry disposed upon the second boards 116 form the switch core of the switch. And, circuitry disposed upon the third circuit boards 118, similar to the circuit boards 114, form conventional, terminal connection units. The terminal connection units may again be a series of cascaded multiplexer/demultiplexer devices disposed upon a series of circuit boards and coupled together by couplers.

Signal paths 122 connect the circuit boards 114 and the circuit boards 116 of the respective circuit portions 112 together. Signal paths 124 connect to the circuit boards 116 and 118 of the respective circuit portions together. The signal paths 122 and 124 are formed of electrical, optical, or other couplers.

During assembly of the telephonic switch 100, a circuit assembler connects the various circuit boards of the circuit portions together by coupling the couplers forming the signals paths 122 and 124 of the various circuit boards together. When the terminal connection units are formed of the cascaded-together series of multiplexer/demultiplexer devices, these devices must also be coupled together by the assembler.

A switch termination unit terminal (STUT) 126 is coupled to the circuit boards 114 of each of the circuit portions 112 by way of signal paths 128, formed of electrical, optical, or other couplers. Signals generated by a device, here a central processor 132 are applied to the redundant circuit portions 112 by way of the signal paths 128, and the switch termination unit terminal forms a portion of the central processor 132. Only a single switch termination unit terminal 126 is illustrated in the figure in connection with the circuit portions 112. Additional switch termination unit terminals 126 may also be, and typically are, coupled to the terminal connection units disposed upon the circuit boards 114.

Another switch termination unit terminal 134 is also illustrated in the figure. The switch termination unit terminal 134 is coupled to the circuit boards 118 by way of signal paths 136, again formed of an electrical, is optical, or other coupler. The switch termination unit terminal 134 forms a portion of a device 138. Again, although additional switch termination unit terminals 134 are not illustrated in the figure, typically, a plurality of devices are connected to the terminal connection units disposed upon the circuit boards 118 by way of a plurality of switch termination unit terminals 134.

Also, while not shown, connections between the switch core disposed upon the circuit boards 116 are formed when the telephonic switch is assembled such that the circuit boards 116 are stacked upon one another or plugged into a circuit backplane. Analogous connections can be made between the terminal connection units disposed upon the circuit boards 114 and between the terminal connection units disposed upon the terminal connection units 118.

The terminal connection units disposed upon each of the circuit boards 114 and the terminal connection units disposed upon the circuit boards 118 each include at least either a device processor 142 and an allocation set up terminal 144. An allocation setup terminal is a hardware logic device. The terminal connection units disposed upon such circuit boards also include a plane compare/majority vote (PC/MV) device 146. The PC/MV devices 146 are operable in conventional manner to poll values of signals received at, or generated at, the circuit boards 114 and 118, respectively.

The switch cores disposed upon the circuit boards 116 also each include a device processor and an allocation set up terminal, indicated in the figure by reference numerals 152 and 154, respectively. Either the processor 152 or the terminal 154, or a combination thereof, form a cyclic redundancy code to generator (CRCG) 156. For purposes of illustration, the CRCGs 156 are separately indicated in the figure.

As examination of the illustration of the telephonic switch 100 indicates, numerous signal paths, signal paths 122, 124, 128, and 136 are required to be formed during assembly of the switch. Additional signal paths may be formed of signal paths coupling cascaded portions of the termination connection units, as noted previously.

Testing for the correctness of the connections forming the various signal paths is necessary to ensure that the correct connections have been formed during assembly of the switch. Operation of an embodiment of the present invention permits such determinations to be made.

Figure 5:
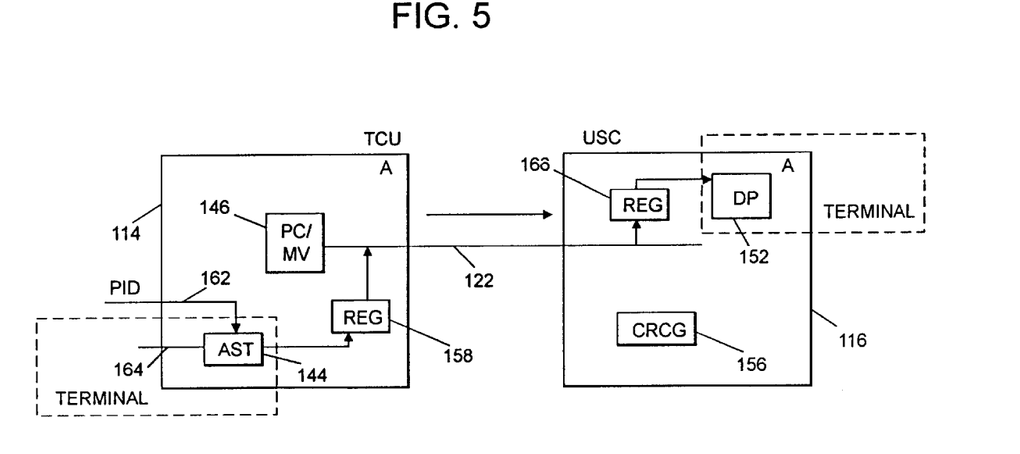
FIG. 5 is a functional block diagram showing in greater detail two connected circuit elements which form portions of the telephonic switch shown in FIG. 4.

FIG. 5 illustrates a portion of the telephonic switch 100 in greater detail. The illustrated portion includes circuit boards 114 and 116 of one of the circuit portions 112, as described previously. Circuitry forming a terminal connection unit is disposed upon the circuit board 114, and circuitry forming the switch circuitry of a switch core is disposed upon the circuit board 116. A signal path 122 is again shown to connect the circuit boards 114 and 116.

The terminal connection unit disposed upon the circuit board 114 is again shown to include an allocation set up terminal 144 and a PC/MV device 146. As in this embodiment, the terminal connection unit includes an allocation set up terminal 144, the terminal connection unit does not further include a device processor, shown in the alternative to an allocation set up terminal in the circuit shown in FIG. 4. The plane comparator/majority voter 146 of the terminal connection unit disposed upon the circuit board 114 is again illustrated in the figure.

The allocation set up terminal 144 is coupled to the signal path 122 by way of a register 158. The terminal 144 is coupled to receive plane identification bits on the line 162 and command signals on the line 164. Signals generated on the lines 162 and 164 can, for example, be generated by the central processor 132, shown in FIG. 4.

The switch core disposed upon the circuit board 116 is here shown to include a device processor 152, a cyclic redundancy code generator 156 and a register 166. The register 166 is coupled between the signal path 122 and the device processor 152.

Once a circuit assembler has connected the coupler forming the signal path 122 in a manner believed to form the connection shown in FIG. 5, a test to verify for the correctness of the connection can be performed. In normal protocol of communication between the terminal connection unit and the switch core, data is transmitted between the terminal connection unit and the switch core in designated time slots wherein groups of time slots together define a frame of data.

In one embodiment of the present invention, application of plane ID signals on the line 162 and a control signal generated on the line 164 causes generation of a coded signal which is transmitted upon the signal path 122. Either, or both, the plane ID signal and the control signal can be generated by a central processor, such as the central processor 132 shown in FIG. 4. The coded signal is received by the switch core disposed upon the circuit board 116 when the signal path 122 has been properly connected to the circuit board 116. Detection of the coded signal transmitted upon the signal path 122 at the circuit board 116 verifies that the coupler forming the signal path 122 has been correctly connected.

Figure 6:
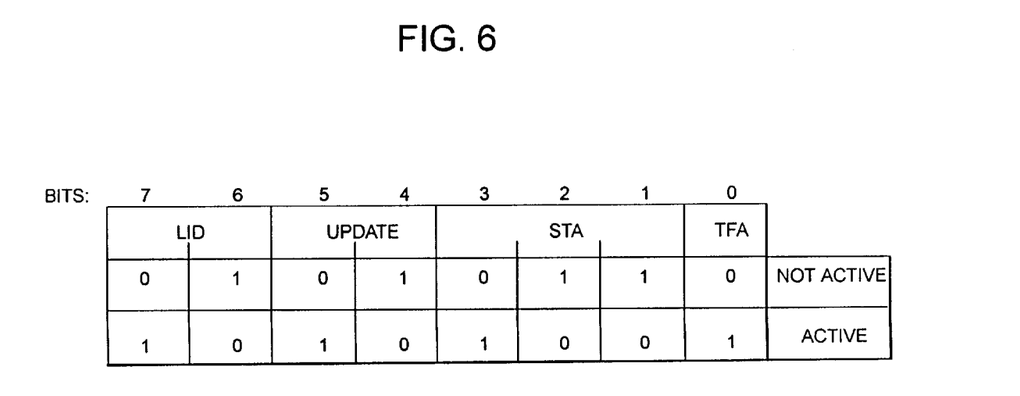
FIG. 6 illustrates a bit sequence of a signal transmitted during operation of an embodiment of the present invention to test the connection between the circuit elements of the circuits shown in the preceding figures.

FIG. 6 illustrates the coded signal transmitted in one embodiment of the present invention to test for the correct connection of the coupler forming the signal path 122 connecting the circuit boards 114 and 116 of the various circuit portions 112. The coded signal here forms the two most significant bits of a bit sequence forming a link ID updates status (LUS) time slot which is transmitted during one frame of data. The coded signal is identified by LID bits formed of bits 7 and 6 of the time slot.

Other bits transmitted during the LUS time slot are generated for other purposes and are here indicated to include the UPDATE bits which are used between terminal connection units for purposes of synchronization, STA bits and TFA bits, both of which are used for alarm purposes. When the LID bits are of the logical values "10", the coded signal is defined to be active, and the receiving terminal, the device processor of the switch core shown in FIG. 5, detects the presence of such signal values in the LUS time slot.

Figure 7:
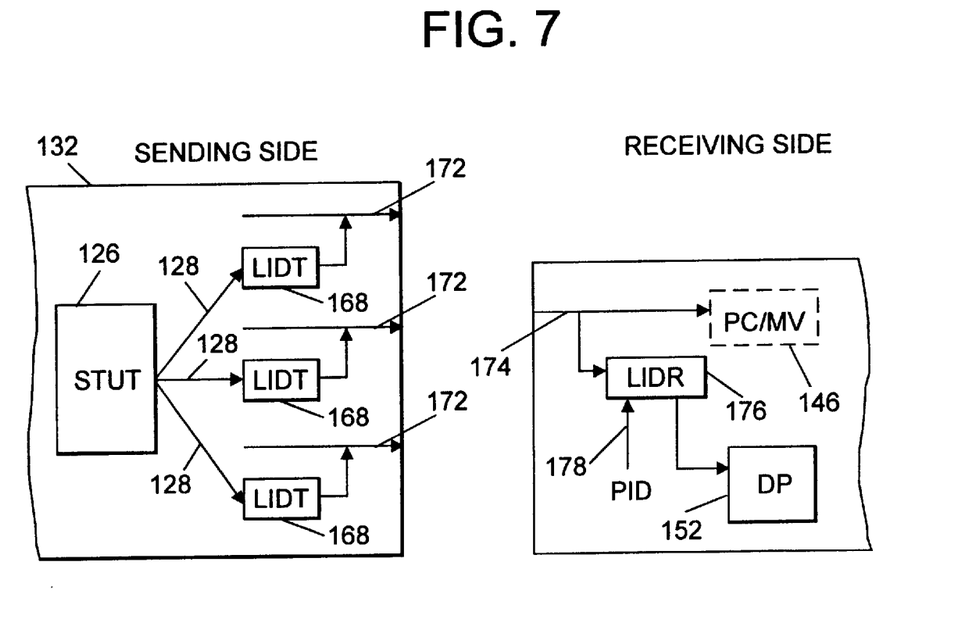
FIG. 7 is a functional block diagram illustrating in greater detail connections between several of the circuit elements forming portions of the telephonic switch shown in FIG. 4.

FIG. 7 also illustrates a portion of the telephonic switch 100 shown in FIG. 4. In this illustration, the switch termination unit terminal 126 forming a portion of a central processor 132 is connected to link ID transmitters 168 which are connected to the switch termination unit terminal 126 by way of signal paths 128. The link ID transmitters 168 are formed of circuitry analogous to the circuitry disposed upon the circuit board 114 forming the terminal connection unit shown in FIG. 5. The link ID transmitters and switch termination unit terminal form the "sending side" which transmits coded signals to a "receiving side."

The transmitters 168 generate signals which are supplied at terminal connection links 172. A terminal connection link 174 of a single receiving element, here a terminal connection unit or a switch core is also illustrated. A link ID receiver 176 formed of, for example, circuit elements corresponding to the circuitry illustrated to form portions of the switch core disposed upon the circuit board 116 in the illustration of FIG. 5 is also shown.

The link ID receiver 176 is further coupled to receive plane ID signals on line 178 and is coupled to a device processor 152. A plane comparator/majority voter 146 is also indicated, in dash in the figure. A test to verify the correctness of the connection of the signal path formed of a coupler interconnecting the sending side and receiving side is performed by transmitting coded signals, as described above, from the transmitters 168 and detecting their reception by the receiver 176.

Figure 8:
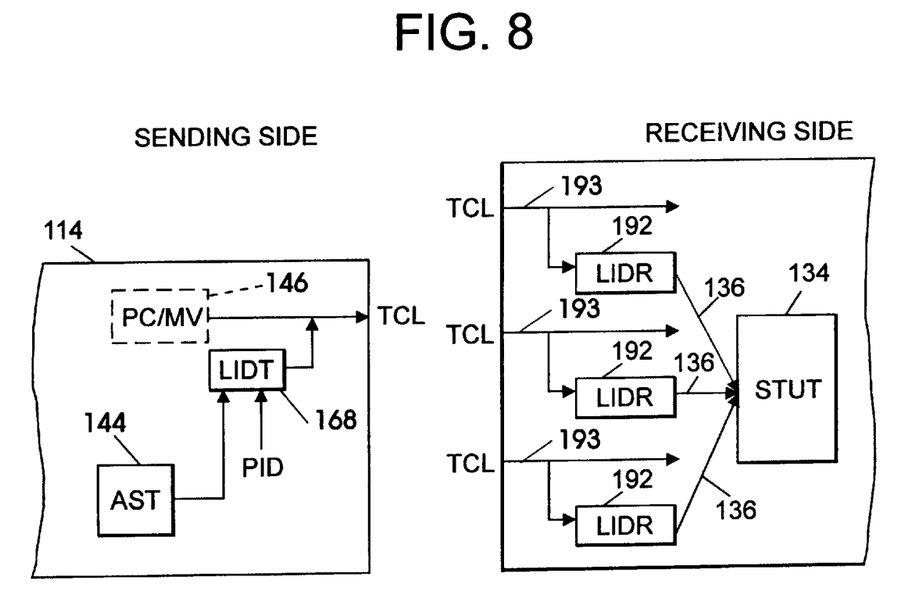
FIG. 8 is a functional block diagram, similar to that shown in FIG. 7, but illustrating connections between other circuit elements of the telephonic switch shown in FIG. 4.

FIG. 8 illustrates another portion of the telephonic switch 100 shown in FIG. 5. In this illustration, a switch core 114 of one plane forms the sending side which transmits the link ID sequence. A link ID transmitter, here coupled to receive signals generated by an allocation set up terminal and to receive plane ID signals inserts an active, link ID bit sequence into an LUS time slot for transmission upon a signal path to a receiving side.

All three planes of the receiving side are shown. Each plane includes a link ID receiver 192 which is coupled by way of a terminal communication link 192 to receive the link ID signal transmitted by the sending side. The link ID receivers 192 are each coupled to a switch termination unit terminal 134 by way of signal paths 136.

Figure 9:
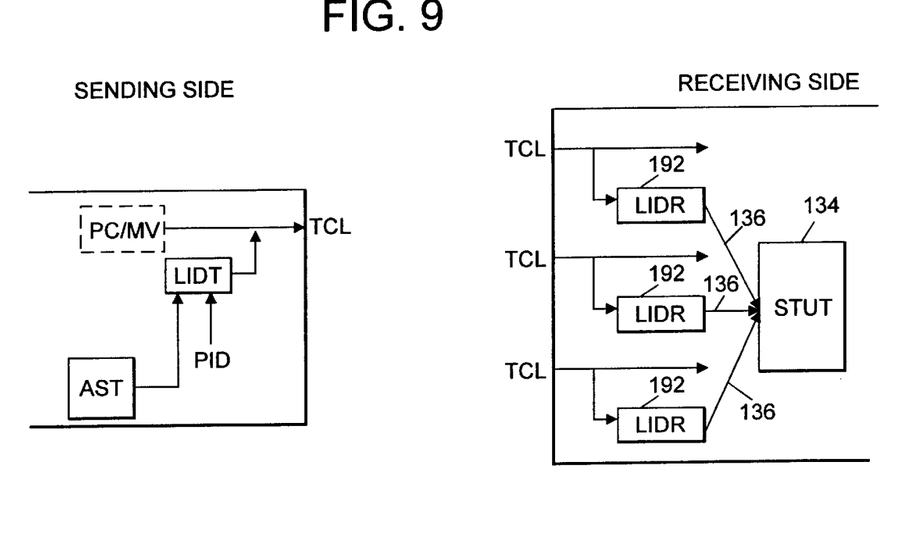
FIG. 9 is a functional block diagram, similar to those shown in FIGS. 7–8 but which illustrates connections between other circuit elements of the telephonic switch shown in FIG. 4.

FIG. 9 also illustrates a portion of the telephonic switch 100 shown in FIG. 5. In this illustration, a terminal connection unit 112 of one plane forms the sending side which transmits the link ID sequence. A link ID transmitter, here coupled to receive signals generated by an allocation setup terminal and to receive plane ID signals inserts an active, link ID bit sequence into an LUS time slot for transmission upon a signal path to a receiving side. All three planes of the receiving side are shown. Each plane includes a link ID receiver 192 which is coupled by way of a terminal communication link 192 to receive the link ID signal transmitted by the sending side. The link ID receivers 188 are each coupled to a switch termination unit terminal 134 by way of signal paths 136.

Figure 10:
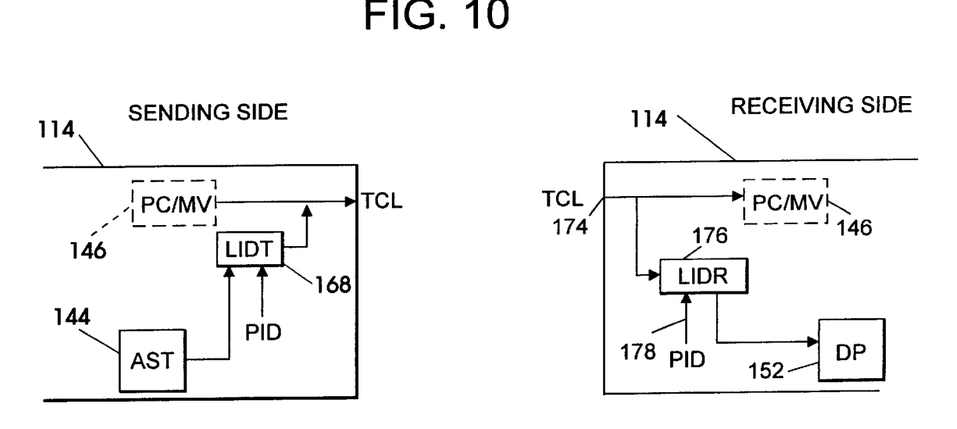
FIG. 10 is another functional block diagram, similar to those shown in FIGS. 7–9, but which illustrate connections between other circuit elements of the telephonic switch shown in FIG. 4.

FIG. 10 illustrates another portion of the telephonic switch 100 shown in FIG. 5. In this illustration, a terminal connection unit 112 of one plane forms the sending side which transmits the link ID sequence. A link ID transmitter, here coupled to receive signals generated by an allocation setup terminal and to receive plane ID signals inserts an active, link ID bit sequence onto an LUS time slot for transmission upon a signal path to a receiving side.

A terminal connection link 174 of a single receiving element, here a cascaded, terminal connection unit forms a receiving side. A link ID receiver 176 formed of, for example, circuit elements corresponding to the circuitry illustrated to form portions of a terminal connection unit disposed upon the circuit board 112 in the illustration of FIG. 5 is again shown.

Operation of an embodiment of the present invention permits a determination to be made of the correctness of connections formed between circuit elements of circuit portions of a circuit having redundant circuit portions. Coded signals are transmitted and detection of the coded signals indicates correct connection of the coupler forming the signal path. Because a coded signal is transmitted, the connection of any type of coupler, such an optical or other non-physical coupler, can be tested and verified to be correct.

In the event that a misconnection is determined, an appropriate corrective reassembly of the connection between the circuit elements can be made. When the circuit forms a telephonic switch, the coded signal, can, as above-described, form a sequence of signal bits generated during a single time slot of a frame transmitted between elements of the telephonic switch. In the event that a misconnection is detected, reassembly of the affected portion of the switch can be made.

The previous descriptions are of preferred examples for implementing the invention, and the scope of the invention should not necessarily be limited by this description. The scope of the present invention is defined by the following claims.

What is claimed is:

1. A method of testing for an erroneous interconnection between separate, redundant circuit portions in a circuit formed of a plurality of redundant circuit portions, the separate, redundant circuit portions connected in parallel with one another such that each redundant circuit portion receives identical input signals, and the redundant circuit portions, when correctly constructed, respectively providing wholly separate and non-overlapping signal paths for simultaneously generating redundant output signals, wherein each of the redundant circuit portions includes a first circuit element and at least a second circuit element adjacent to said first circuit element in the associated signal path, said method comprising the steps of:

generating, at the first circuit element of a first redundant circuit portion, a coded signal having a selected signal value;

detecting whether said coded signal is received at the adjacent second circuit element of the first redundant circuit portion; and determining that the separate, redundant circuit portions are erroneously interconnected if the coded signal is not detected at the adjacent second circuit element of the first redundant circuit portion.

2. The method of claim 1 comprising the further step of determining whether said coded signal is received at a second circuit element of a second redundant circuit portion.

3. The method of claim 2 comprising the further step of annunciating times in which a determination is made whether the coded signal is received at the second circuit element of the second redundant circuit portion, the determination indicative of the erroneous interconnection of the circuit elements between the separate, redundant circuit portions.

4. The method of claim 1 wherein said coded signal comprises a binary sequence of digits.

5. The method of claim 1 wherein the circuit comprises a telephonic switch, the redundant circuit portions comprise redundant planes of the telephonic switch, the first circuit element comprises a terminal connection device, and the second circuit element comprises a switch core, and wherein said step of generating comprises generating the coded signal at the terminal connection device of the first plane.

6. The method of claim 5 wherein said step of detecting comprises detecting when the coded signal generated at the terminal connection device during said step of generating is received at the switch core of the first plane.

7. The method of claim 1 wherein the circuit comprises a telephonic switch, the redundant circuit portions comprise redundant planes of the telephonic switch, the first circuit element comprises a switch core, and the second circuit element comprises a terminal connection device, and wherein said step of generating comprises generating the coded signal at the switch core of the first plane.

8. The method of claim 7 wherein said step of detecting comprises detecting when the signal generated at the switch core during said step of generating is received at the terminal connection device of the first plane.

9. The method of claim 1 wherein the circuit comprises a telephonic switch, the redundant circuit portions comprise redundant planes of the telephonic switch, the first circuit element comprises a switch termination unit terminal common to each of the redundant planes, and the second circuit element comprises a terminal connection device, and wherein said step of generating comprises generating the coded signal at the switch termination unit terminal.

10. The method of claim 9 wherein said step of detecting comprises detecting when the coded signal generated at the switch termination unit terminal is received at the terminal connection device of the first plane.

11. The method of claim 1 wherein the circuit comprises a telephonic switch, the redundant circuit portions comprise redundant planes of the telephonic switch, the first circuit element comprises a terminal connection device of the first plane, and the second circuit element comprises a switch termination unit terminal common to each of the redundant planes, and wherein said step of generating comprises generating the coded signal at the terminal connection device of the first plane.

12. The method of claim 11 wherein said step of detecting comprises detecting when the coded signal generated at the terminal connection device during said step of generating is received at the switch termination unit terminal.

13. Testing apparatus for testing for an erroneous interconnection between separate, redundant circuit portions of a circuit formed of a plurality of said redundant circuit portions, the separate, redundant circuit portions connected in parallel with one another such that each redundant circuit portion receives identical input signals, and said redundant circuit portions, when correctly constructed, respectively providing wholly separate and non-overlapping signal paths for simultaneously generating redundant output signals, wherein each of the redundant circuit portions includes a first circuit element and at least a second circuit element adjacent to said first circuit element in the associated signal path, said apparatus comprising:

a signal generator positioned at the first circuit element of a first said redundant circuit portion for generating a coded signal having a selected signal value; and a correct-connection verifier positioned at the adjacent second circuit element of the first redundant circuit portion, said correct-connection verifier for detecting whether the coded signal is received at the adjacent second circuit element, lack of detection of the signal by said correct-connection verifier indicative of an erroneous interconnection between separate, redundant circuit portions.

14. In a telephonic switch having synchronously-redundant planes, each of said synchronously-redundant planes having a first circuit element and a second circuit element which, when properly connected together, form adjacent circuit elements in a signal path defined by the plane, the signal paths connected in parallel with one another for simultaneous, redundant processing of an input signal applied to the parallel-connected signal paths, an improvement of an apparatus for testing for an erroneous interconnection between the first circuit element of a first selected plane and the second circuit element of a second selected plane, said apparatus comprising:

a signal generator positioned at the first circuit element of the first selected plane for generating a signal having a selected signal value on the signal path; and a correct-connection verifier positioned at the adjacent second circuit element of the first selected plane, said correct-connection verifier for detecting whether the signal transmitted by said signal generator is received at the adjacent second circuit element of the first selected plane, lack of detection of the signal by said correct-connection verifier indicative of an erroneous interconnection between the first circuit element of the first selected plane and the second circuit element of the second selected plane.

* * * * *